United States Patent
Holzapfel et al.

(10) Patent No.: US 9,200,893 B2
(45) Date of Patent: Dec. 1, 2015

(54) POSITION-MEASURING DEVICE AND SYSTEM HAVING A PLURALITY OF POSITION-MEASURING DEVICES

(71) Applicant: Dr. Johannes Heidenhain GmbH, Traunreut (DE)

(72) Inventors: Wolfgang Holzapfel, Obing (DE); Joerg Drescher, Samerberg (DE); Markus Meissner, Uebersee (DE); Ralph Joerger, Traustein (DE); Bernhard Musch, Otterfing (DE); Thomas Kaelberer, Schrobenhausen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 175 days.

(21) Appl. No.: 13/757,533

(22) Filed: Feb. 1, 2013

(65) Prior Publication Data

US 2013/0194584 A1 Aug. 1, 2013

Related U.S. Application Data

(60) Provisional application No. 61/593,582, filed on Feb. 1, 2012.

(30) Foreign Application Priority Data

Feb. 1, 2012 (DE) .................. 10 2012 201 393

(51) Int. Cl.
  *G01B 11/02* (2006.01)
  *G01B 11/14* (2006.01)
  *G01D 5/26* (2006.01)
  *G01D 5/38* (2006.01)

(52) U.S. Cl.
  CPC .............. *G01B 11/14* (2013.01); *G01D 5/266* (2013.01); *G01D 5/38* (2013.01)

(58) Field of Classification Search
  CPC .......... G01B 9/02015; G01B 9/02017; G01B 9/02018; G01B 9/02019; G01B 11/14; G01D 5/266; G01D 5/38
  See application file for complete search history.

(56) References Cited

U.S. PATENT DOCUMENTS

| 6,208,407 | B1* | 3/2001 | Loopstra ..................... 355/53 |
| 6,542,247 | B2 | 4/2003 | Bockman |
| 7,352,473 | B2 | 4/2008 | Adriaens et al. |
| 7,751,060 | B2 | 7/2010 | Tanaka |
| 7,907,287 | B2 | 3/2011 | Sekiguchi |
| 2005/0259268 | A1* | 11/2005 | Schluchter ................. 356/500 |
| 2009/0273767 | A1* | 11/2009 | Makinouchi ................. 355/53 |

FOREIGN PATENT DOCUMENTS

EP 1 469 351 10/2004

OTHER PUBLICATIONS

"Laserinterferometrische Messverfahren—Moeglichkeiten, Grenzen und Anwendungen", presentation by Gerd Jaeger, Doctor of Engineering at the 3rd ITG/GMA professional convention "Sensoren und Messsysteme", Mar. 9-11, 1998.

* cited by examiner

*Primary Examiner* — Michael A Lyons
(74) *Attorney, Agent, or Firm* — Kenyon & Kenyon LLP (57) ABSTRACT

In position-measuring devices and a systems having a plurality of position-measuring devices for determining the position of an object in several spatial degrees of freedom, the plurality of optical position-measuring devices scan the object from a single probing direction, and the probing direction coincides with one of the two main axes of motion.

16 Claims, 7 Drawing Sheets

POSITION-MEASURING DEVICE AND SYSTEM HAVING A PLURALITY OF POSITION-MEASURING DEVICES

CROSS-REFERENCE TO RELATED APPLICATIONS

The present application claims the benefit of U.S. Provisional Patent Application No. 61/593,582, filed on Feb. 1, 2012, and claims priority to Application No. 10 2012 201 393.8, filed in the Federal Republic of Germany on Feb. 1, 2012, each of which is expressly incorporated herein in its entirety by reference thereto.

FIELD OF THE INVENTION

The present invention relates to a position-measuring device and to a system having a plurality of position-measuring devices.

BACKGROUND INFORMATION

In machines which are used for manufacturing and inspecting semiconductor components, objects must often be precisely positioned. For example, it may be necessary to position wafers extremely precisely below a tool of an exposure or inspection unit. In that case, the wafer lies on a table that is movable in six degrees of freedom and is moved via an associated drive. Thus, the table acts as an object whose position is to be determined with great accuracy. In order to position the table via the drive and an associated control unit, it is necessary to generate position signals with respect to the spatial position of the table with the aid of extremely precise position-measuring devices.

Interferometers and grating-based optical position-measuring devices are usually used as extremely precise position-measuring devices in such machines. However, problems result in both types of position-measuring devices when the travel path of the table along an intended axis of motion is greater than the extension or length of the table in this axis of motion.

With the aid of interferometers, the position of the table in a travel direction or axis of motion is usually determined by the probing of a measuring reflector in the form of a mirror using a measuring beam. In so doing, the measuring beam travels parallel to the determined axis of motion and is anchored so as to be fixed in position with the machine. If the table additionally moves in a second travel direction, it must be ensured that the measuring beam strikes the mirror at each position of the table. If the distance traveled in the second travel direction is greater than the side length of the table, and therefore also greater than the side length of the mirror mounted on the table, then in certain positions, the measuring beam no longer strikes the mirror, and the interferometer can no longer generate correct position signals, that is, the interferometer loses the determined position. To avoid such a loss of the position, the mirror must therefore be scanned with the measuring beam of an additional second interferometer axis that is offset in the second travel direction relative to the first measuring beam, such that at each position of the table, at least one of the two measuring beams strikes the mirror. Since interferometers usually only measure a position incrementally and not absolutely, it is furthermore necessary that the absolute position be transferred between both interferometer axes, before one of the measuring beams no longer strikes the mirror. This is referred to as a position transfer. Therefore, using interferometers which measure the table position from outside, i.e., from a fixed reference system, without further auxiliary axes and position transfer, only a maximal travel path which corresponds to the length of the table along the respective axis of motion is measurable.

If, as an alternative, the corresponding interferometer components are carried along on the moving table and the interferometer measures outwards in the direction of the fixed reference system, problems then result in connection with the light feed and the detection of the interferometer signals. Furthermore, due to the additional interferometer components on the table, the mass of the moving table increases, which impairs its dynamic performance.

In addition, a large measuring loop results as a further disadvantage. This means that the interferometer does not determine the position of the table directly relative to the respective tool, but rather relative to a remote reference, usually the mounting location of an optical unit of the interferometer, i.e., the interferometer head. Consequently, a possible drift in position between the optical unit and the tool is reflected directly in a drift of the measured position. Typically, the spatial distance between the optical unit and the tool may lie in the range of 1 to 2 m, whereas the measuring accuracies required for such applications lie in the nm-range.

Furthermore, in order to use interferometers to determine the motion of the table along two axes of motion perpendicular to one another, it is necessary that the moving table be accessible optically from two sides, which in turn results in certain restrictions in the design of the respective machine.

In the event grating-based position-measuring devices, made up of a measuring standard and one or more scanning units, are used, the measuring length available is limited by the length of the specific measuring standard. For a highly dynamic application, it is considered advantageous as a matter of principle to provide the scanning unit of such a position-measuring device in the fixed reference system, and the measuring standard on the moving table. On the other hand, however, the table should be constructed as compactly as possible, which in turn restricts the possible length of the measuring standard considerably. In particular, it is considered to be disadvantageous to choose a length for the measuring standard that is greater than that of the moving table along the axis of motion. Thus, the realization of travel paths, especially in the applications mentioned above, may be problematic with such an arrangement of conventional grating-based position-measuring devices as well, if the requisite travel path is greater than the length of the moving table along this axis of motion.

On the other hand, if, conversely, the scanning units of the grating-based position-measuring device are mounted on the moving table, then its mass in turn increases and influences its dynamic performance disadvantageously. The necessary cable connections which connect the scanning units to the fixed reference system are also considered to be disadvantageous in this case.

Conventional systems are described, for example, in European Published Patent Application No. 1 469 351, U.S. Pat. No. 7,907,287, U.S. Pat. No. 7,751,060 B2, and the presentation by Gerd Jaeger, Doctor of Engineering at the third ITG/GMA professional convention "Sensoren und Messsysteme" (Sensors and Measuring Systems) (Mar. 9-11, 1998, Bad Nauheim) having the title "Laserinterferometrische Messverfahren—Moeglichkeiten, Grenzen und Anwendungen" (Laser-interferometric Measuring Methods—Possibilities, Limits and Practical Applications).

SUMMARY

Example embodiments of the present invention provide for the highly precise determination of the position of a movable object, via which a travel path is able to be realized along at least one axis of motion of the object, regardless of the extension of the object.

According to an example embodiment of the present invention, a position-measuring device for determining a position of an object along a third axis oriented perpendicularly to two orthogonal, first and second main axes of motion of the object includes: a light source adapted to emit a beam of rays along the first main axis of motion in a direction of the object; a measuring standard arranged on the object and including graduation markings disposed periodically along the third axis; at least one reflector arranged along the third axis and set apart from the object; a retroreflector system; and a detector system. Position signals with respect to motion of the object along the third axis are generatable from superposition of a measuring beam and a reference beam produced from the beam of rays.

The retroreflector system may include a beam-splitter element, a reference reflector, and a retroreflector.

The reflector may include an incident-light diffraction grating having graduation markings disposed periodically along the first main axis of motion.

The reflector may include a plane mirror disposed perpendicularly to the measuring beam that falls on the plane mirror.

The measuring standard may include an incident-light diffraction grating adapted to diffract beams of rays only in a $+/-1^{st}$ order and to reflect diffracted partial beams of rays of the $+/-1^{st}$ order in a direction of the reflector.

The retroreflector system may be adapted to split the beam of rays emitted by the light source into:
  (a) a measuring beam that:
    (i) propagates in a direction of the measuring standard, and by the measuring standard, undergoes a first reflection and diffraction in a direction of the reflector;
    (ii) undergoes a first reflection by the reflector back in the direction of the measuring standard;
    (iii) undergoes a first reflection by the measuring standard back in a direction of the retroreflector system, where the measuring beam undergoes a retroreflection and reflection back in the direction of the measuring standard;
    (iv) undergoes, at the measuring standard, a second reflection and diffraction in the direction of the reflector;
    (v) undergoes, at the reflector, a second reflection back in the direction of the measuring standard; and
    (vi) undergoes, at the measuring standard, a second reflection back in the direction of the retroreflector system; and
  (b) a reference beam that:
    (i) traverses the retroreflector system;
    (ii) is then superposed with the measuring beam arriving after the second reflection back at the measuring standard; and
    (iii) propagates, with the superposed measuring beam, in the direction of the detector system.

According to an example embodiment of the present invention, a position-measuring device for determining a position of an object along a second main axis of motion, the object movable along a first main axis of motion and movable along the second main axis of motion, the first and second main axes of motion being orthogonal, includes: a light source adapted to emit a beam of rays along the first main axis of motion in a direction of the object; a measuring standard arranged on the object and including graduation markings disposed periodically along the second main axis of motion; at least one reflector arranged in a direction of a third axis, set apart from the object, the third axis arranged perpendicularly to the two first and second main axes of motion; a retroreflector system; and a detector system. Position signals with respect to motion of the object along the second main axis of motion are generatable from superposition of a measuring beam and a reference beam produced from the beam of rays.

The reflector may include two incident-light diffraction gratings are set apart in a direction of the second main axis of motion and may have periodically disposed graduation markings.

The reflector may include two plane mirrors set apart in the direction of the second main axis of motion, and each plane mirror may be arranged perpendicularly to the measuring beam that falls on the plane mirror.

The measuring standard may include an incident-light diffraction grating adapted to diffract a beam of rays only in a $+/-1^{st}$ order, and to reflect diffracted partial beams of rays of the $+/-1^{st}$ order as the measuring beam and the reference beam in a direction of the reflector.

The measuring standard may be arranged as a one-dimensional measuring standard disposed on the object at an angle unequal to 0° relative to the third axis.

The measuring standard may be arranged as a two-dimensional measuring standard disposed on the object parallel to the third axis and may include graduation markings disposed periodically along the third axis.

The light source may be adapted to emit the beam of rays to propagate in a direction of the measuring standard, and the measuring standard may be adapted to split the beam of rays into two partial beams of rays, as the measuring beam and the reference beam for interferential generation of position signals, that: (a) propagate, after being reflected at the measuring standard, in different directions to the reflector; (b) undergo, at the reflector, a first reflection back in the direction of the measuring standard; (c) undergo, at the measuring standard, a first reflection back in a direction of the retroreflector system, where the two partial beams of rays undergo a retroreflection and reflection back in the direction of the measuring standard; (d) undergo, at the measuring standard, a second reflection and diffraction in a direction of the reflector; (e) undergo, at the reflector, a second reflection back in the direction of the measuring standard; and (f) are recombined at the measuring standard and propagate as a superposed beam of rays from the measuring standard in a direction of the detector system.

According to an example embodiment of the present invention, a system includes: an object movable along two orthogonal, first and second main axes of motion and along a third axis perpendicular to the first and second main axes of motion; and a plurality of position-measuring devices adapted to determine a position of the object in several spatial degrees of freedom. The plurality of optical position-measuring devices are adapted to scan the object from a single probing direction that coincide with one of the main axes of motion.

All measuring standards and/or measuring reflectors of the position-measuring devices provided on the object may be located on one common side of the object.

A position-measuring device adapted to determine motion of the object along the first main axis of motion and to determine rotational motions of the object about the second main axis of motion and about the third axis may be arranged as a 3-axis interferometer having three measuring beams configured to impinge on a measuring reflector on the object, in which a first measuring beam and a second measuring beam travel at the same level in the third axis and set apart in the second main axis of motion and a third measuring beam travels in a direction of the third axis below the first measuring beam and the second measuring beam.

To determine motion of the object along the third axis and to determine rotational motion of the object about the first main axis of motion, the system may include two position-measuring devices, as described above, having two measuring beams arranged to impinge on a measuring standard on the object, the two measuring beams traveling at the same level along the third axis and set apart in the second main axis of motion.

To determine motion of the object along the second main axis of motion, the system may include a position-measuring device, as described above, having a measuring beam that impinges on a measuring standard on the object.

Thus, the demanded long travel path of the object along one axis of motion may be provided, and at the same time, the highly precise determination of the position of the object may be ensured using the measures described herein.

The arrangements described herein do not entail increase of the mass of the moving object due to additional components of position-measuring devices. Likewise, it is possible to dispense with cable connections from the moving object to the fixed reference system, that is, exclusively passive components of the position-measuring device(s) are disposed on the moving object.

In certain example embodiments of the system, all six degrees of freedom of a correspondingly movably mounted object may be measured.

In this context, it is also possible to in each case use first and second position-measuring devices independently of the overall system, when an appropriate measuring task arises.

In order to measure all six degrees of freedom of the corresponding object, the object only has to be optically probed or scanned from a single probing direction. Preferably, this is carried out from the direction which corresponds to the longer main axis of motion. In this manner, additional arrangements are possible such as when, for example, the corresponding object is in the form of a movable table in a machine.

Further features and aspects of example embodiments of the present invention are described in more detail below with reference to the appended Figures.

DETAILED DESCRIPTION

Figure 1:
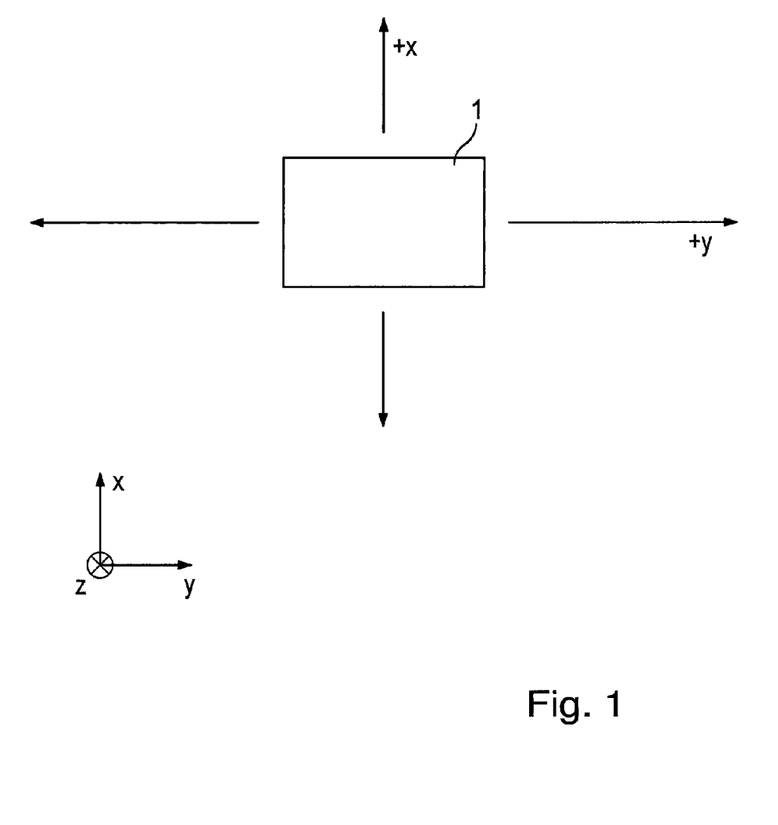
FIG. 1 schematically illustrates different axes along which an object is movable.

FIG. 1 schematically illustrates the various axes x, y, z along which object 1 moves, and whose motion along the various axes x, y, z is to be determined, are identified for the following description. Object 1, represented only schematically, is a table of a machine, for example, which is used for producing or inspecting semiconductor devices. For instance, placed on the table may be a wafer which, for the purpose of processing or inspection, is to be positioned extremely precisely relative to another machine component. The table, or more precisely, object 1, moves along a long traversing axis, i.e., along a first main axis of motion y and along a shorter, second main axis of motion x perpendicular thereto. In addition, a motion of object 1 along a third axis z is possible, which in turn, is aligned perpendicularly to first and second main axes of motion y, x. Consequently, a longer travel path is provided for object 1 along first main axis of motion y than along second main axis of motion x perpendicular thereto. In addition, the travel path along first main axis of motion y may be longer than the extension of object 1 along this main axis of motion y.

Besides measuring the linear object motion along the two main axes of motion x, y and third axis z, in order to position object 1 extremely precisely, it is also necessary to ascertain rotational motions of object 1 about the three different axes x, y, z using measuring techniques, in order to determine the position of object 1 in space in all six degrees of freedom. The rotational motions of object 1 about axes x, y, z are denoted hereinafter as Rx-, Ry- and Rz-motion.

To ascertain all six degrees of freedom of movable object 1, a plurality of position-measuring devices are used which may be suitably combined to form an assembly or an overall system. Two of these position-measuring devices, which may also be used independently of the overall system for determining six degrees of freedom, are each described separately hereinafter as first and second devices. Finally, the overall system for determining all six degrees of freedom is explained as a system that includes a plurality of position-measuring devices.

In the following, based on the schematic illustrations of FIGS. 2a to 2d, first of all a position-measuring device according to an example embodiment of the present invention is described, which may be used for determining the object motion along third axis z that is oriented perpendicularly to the two main axes of motion x, y.

Figure 2A:
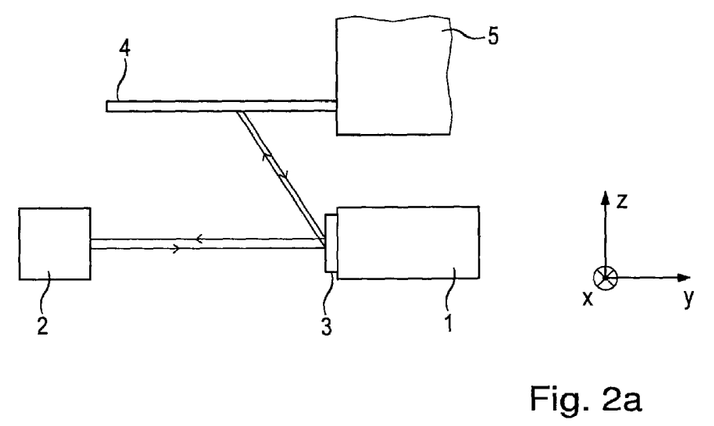
FIG. 2a schematically illustrates a scanning beam path of a position-measuring device according to an example embodiment of the present invention in a first view, in the zy-plane.
Figure 2B:
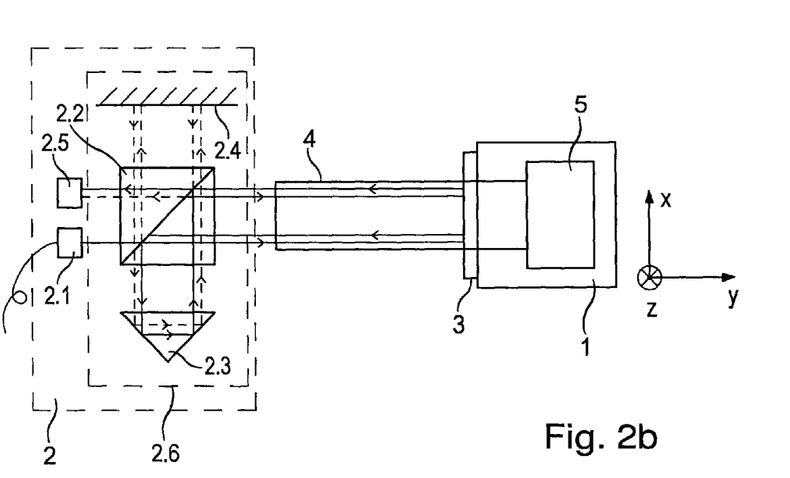
FIG. 2b schematically illustrates the scanning beam path of the position-measuring device, illustrated in FIG. 2a, in a second view, in the xy-plane.

The position-measuring device, which represents a combination of an interferometer and a grating-based position-measuring device, includes a light source 2.1, a measuring standard 3 placed on object 1, a reflector 4 disposed along third axis z, set apart from the object 1, a retroreflector system 2.6 as well as a detector system 2.5. Light source 2.1, retroreflector system 2.6 and detector system 2.5 are disposed in an optical unit 2 which is situated in long, first main axis of motion y, set apart from object 1.

In the following, the beam path is explained, via which position signals with regard to the motion along third axis z are generated in the position-measuring device.

Light source 2.1, e.g., a suitable laser light source having an upstream collimator lens, emits a collimated beam of rays along the y-direction, i.e., along first main axis of motion y, in the direction of object 1. In retroreflector system 2.6 of optical unit 2, the beam of rays strikes a beam-splitter element 2.2, e.g., in the form of a beam-splitter cube. Beam-splitter element 2.2, i.e., its beam-splitter surface, splits the beam of rays falling on it into a measuring beam and a reference beam. Hereinafter, the measuring beam is represented in FIG. 2b by a continuous line, and the reference beam is represented by a dashed line.

After the splitting process, the measuring beam propagates along first main axis of motion y in the direction of object 1, i.e., in the direction of a measuring standard 3 situated on the object. As illustrated in the top view in FIG. 2c, measuring standard 3 includes graduation markings disposed periodically along third axis z and having different optical reflective properties, that is, an incident-light diffraction grating acts as measuring standard 3. It is formed such that a beam of rays falling on it undergoes a diffraction only in the +/−1$^{st}$ order, and the zeroth order is suppressed. In the example shown, a first reflection and diffraction of the incident measuring beam in the direction of reflector 4 result. In this variant, only one of the two resulting diffraction branches, namely, that in the +1$^{st}$ order, is used for generating signals.

Figure 2C:
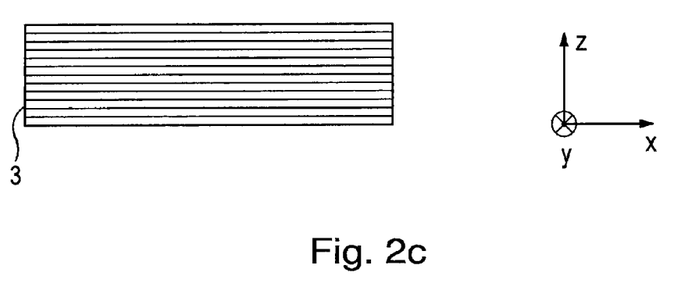
FIG. 2c is a top view of a measuring standard of the position-measuring device illustrated in FIGS. 2a and 2b.
Figure 2D:
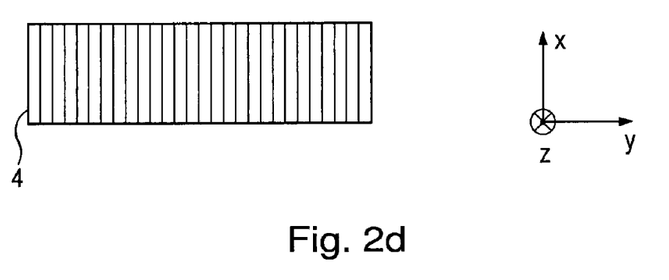
FIG. 2d is a top view of a reflector of the position-measuring device illustrated in FIGS. 2a to 2c.

In exemplary embodiments, measuring standard 3 formed in this manner extends over the complete length of object 1 along second main axis of motion x.

Reflector 4 is disposed along third axis z, set apart from object 1, and is coupled to a machine part 5 which is stationary relative to movable object 1. In this exemplary embodiment, reflector 4 is in the form of an incident-light diffraction grating, via which a reflection of the measuring beam back upon itself results in the direction of measuring standard 3 on the object (Littrow configuration). According to FIG. 2d, which shows a top view of reflector 4, it includes graduation markings of different reflectivity disposed periodically along first main axis of motion y.

Via measuring standard 3, the measuring beam thereupon undergoes a first reflection back in the direction of retroreflector system 2.6. There, in beam-splitter element 2.2, a deflection takes place in the direction of retroreflector 2.3, and subsequently a retroreflection and a reflection once more in the direction of measuring standard 3 on object 1. At measuring standard 3, a second reflection and diffraction result in the direction of reflector 4, before the measuring beam undergoes a second reflection and diffraction at reflector 4 in the direction of measuring standard 3. Finally, the measuring beam is reflected back by measuring standard 3 a second time in the direction of retroreflector system 2.6.

After the splitting process, the reference beam resulting at beam-splitter element 2.2 traverses retroreflector system 2.6 in the manner explained below. Thus, the reference beam propagates initially in the direction of a reference reflector 2.4, e.g., taking the form of a plane mirror, is reflected from there and arrives at retroreflector 2.3, which, for instance, may be formed as a retroreflecting prism. After the deflection resulting via it, the reference beam propagates again in the direction of reference reflector 2.4 and is reflected back again by it upon itself. At the beam-splitter surface of beam-splitter element 2.2, the reference beam is brought to interfering superposition with the measuring beam incoming from object 1. The superposed pair of measuring beam and reference beam subsequently propagates in the direction of detector system 2.5, indicated only schematically. Detector system 2.5 may be in the form of a interferometer detector system which permits the acquisition of phase-shifted interferometer signals. In the event object 1, including measuring standard 3, moves along third axis z, a plurality of phase-shifted position signals therefore result at detector system 2.5, which have a signal period P/4, if P represents the graduation period of measuring standard 3 in the z-direction.

In the case of a further motion component of the object in the y-direction, the position signals generated via detector system 2.5 include additional components. Since the object motion in this first main axis of motion y is usually measured via a separate position-measuring device, this component is known, so that the necessary position information, i.e., the degree of freedom of the object along the z-direction may be determined in conjunction with this information.

In this position-measuring device, the use of retroreflector system 2.6 serves to compensate for beam shears due to possible tiltings of moving object 1 relative to the nominal position. In this context, it should be pointed out that retroreflector system 2.6 in the present context, and especially its retroreflective effect on the measuring beam, may also be implemented in alternative manners. For example, different prism combinations and/or mirror combinations may be used.

In the position-measuring device, position signals regarding the object motion along third axis z are generated by optical scanning of object 1, i.e., of measuring standard 3 disposed on it, from a single probing direction that coincides with first main axis of motion y having the longer travel path.

Other features of the position-measuring device may be provided in addition to or as an alternative to those described above. For example, it may be provided to form reflector 4 above object 1 as a plane mirror positioned perpendicularly to the measuring beam falling on it. Moreover, it is possible to use not just one of the two +/−1st orders of diffraction resulting at measuring standard 3, but rather both resulting orders of diffraction. To that end, a second reflector would then have to be provided below object 1, which would be formed analogously to reflector 4 from the example described. Furthermore, in a corresponding system, it may be provided to use the first position-measuring device described in multiple implementation, depending on the measuring requirements.

A position-measuring device according to another example embodiment of the present invention is described below with reference to FIGS. 3a to 3d. The position-measuring device is used to determine the position of an object 1 along second main axis of motion x, i.e., along the shorter of the two main axes of motion x, y from FIG. 1. As in the case of the position-measuring device described above with reference to FIGS. 2a to 2d, in principle, the position-measuring device described with reference to FIGS. 3a to 3d may also be used separately, that is, independently of the (overall) system yet to be explained below, to determine position.

Figure 3A:
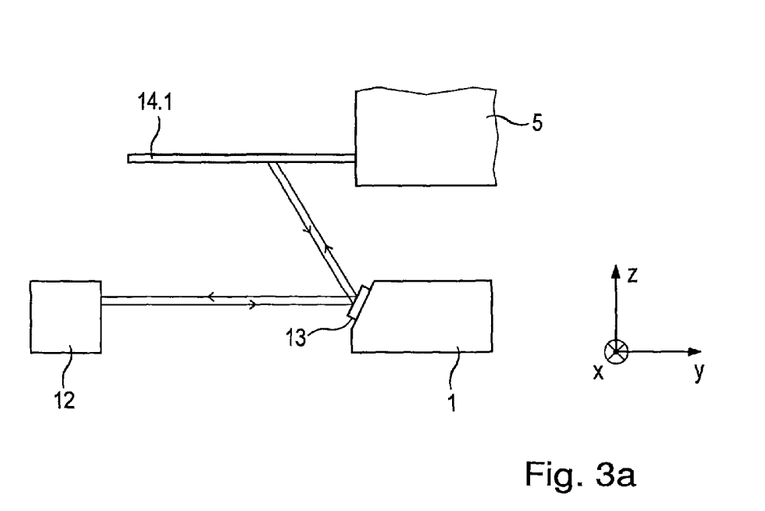
FIG. 3a schematically illustrates a scanning beam path of a position-measuring device according to an example embodiment of the present invention in a first view, in the zy-plane.
Figure 3B:
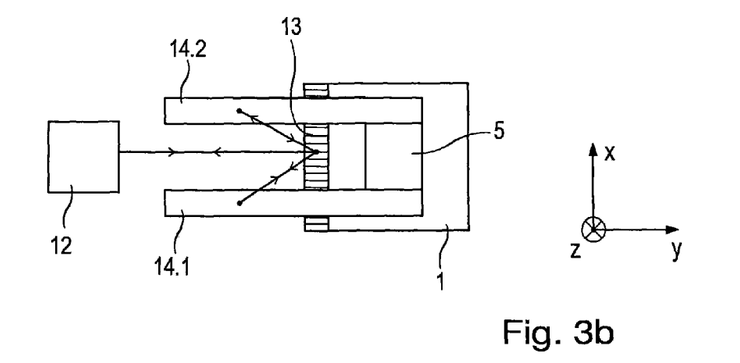
FIG. 3b schematically illustrates the scanning beam path of the position-measuring device illustrated in FIG. 3a in a second view, in the xy-plane.
Figure 3C:
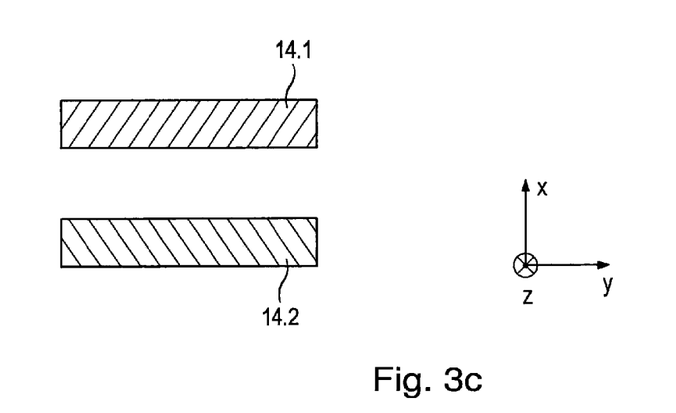
FIG. 3c is a top view of a reflector of the position-measuring device illustrated in FIGS. 3a and 3b.

The position-measuring device includes a light source 12.1, a measuring standard 13 placed on object 1, a reflector 14.1, 14.2 disposed along third axis z, set apart from the object 1, a retroreflector system 12.6, as well as a detector system 12.5. In the exemplary embodiment illustrated, the reflector is a two-piece unit. Light source 12.1, retroreflector system 12.6 and detector system 12.5 are disposed in an optical unit 12 which is situated in long, first main axis of motion y, set apart from object 1. The degree of freedom of the object in second main axis of motion x is thus also determined by optical scanning of object 1, that is, of the components of the position-measuring device disposed on it, from a probing direction which coincides with first main axis of motion y of object 1.

The beam path via which position signals regarding the motion along shorter, second main axis of motion x are generated in the position-measuring device is described in more detail below.

Light source 12.1, e.g., again in the form of a laser light source having an upstream collimator lens, emits a collimated beam of rays along the y-direction, i.e., along first main axis of motion y, in the direction of object 1. In retroreflector system 12.6 of optical unit 12, the emitted beam of rays strikes a beam-splitter element 12.2 in the form of a beam-splitter cube. In beam-splitter element 12.2, the beam of rays transits a deflecting surface 12.7 and propagates along first main axis of motion y in the direction of object 1, i.e., in the direction of measuring standard 13 located on object 1.

Figure 3D:
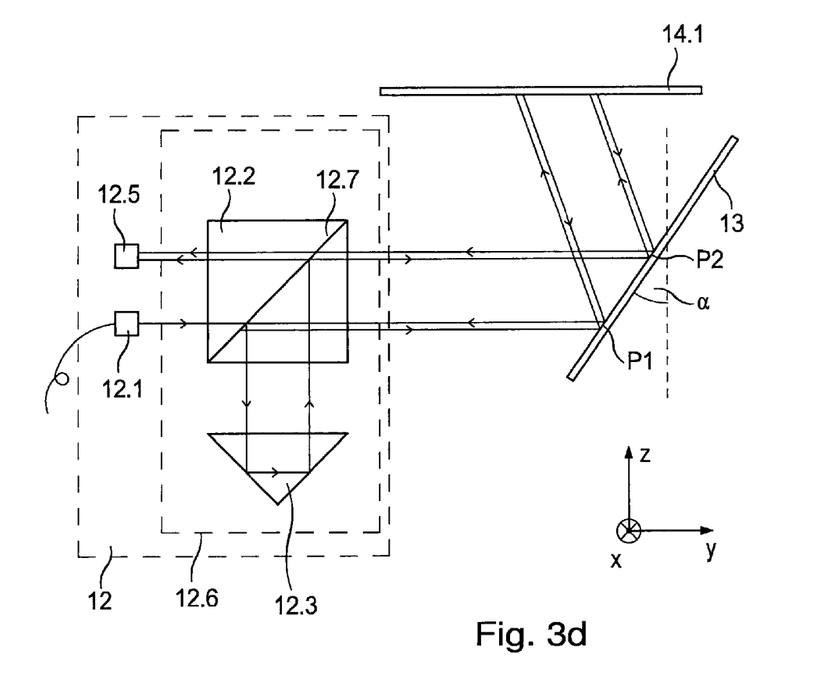
FIG. 3d is an enlarged view of a part of the beam path of the position-measuring device illustrated in FIGS. 3a to 3c, in the zy-plane.

The measuring standard 13 on the object is not disposed perpendicularly relative to the incident beam of rays, that is, parallel to third axis z, but rather at an angle α unequal to 90° relative to the z-axis, i.e., non-parallel with respect to the z-axis, as illustrated in FIG. 3d.

Measuring standard 13, which extends over the complete length of object 1 along second main axis of motion x, includes graduation markings having different optical reflective properties and disposed periodically along second main axis of motion x, as illustrated in FIG. 3b. Thus, an incident-light diffraction grating acts as measuring standard 13. It is formed such that the beam of rays falling on it at a first impact location P1 undergoes a diffraction only in the +/−$1^{st}$ order, and the zeroth order is suppressed. In the position-measuring device, a first reflection and diffraction or splitting of the incident beam of rays into two partial beams of rays result, the partial beams of rays propagating in the direction of two-piece reflector 14.1, 14.2, as indicated in FIG. 3b. Reflector 14.1, 14.2 is disposed along third axis z, set apart from object 1, and is joined mechanically to a machine part 5 which is stationary relative to object 1.

Thus, in the position-measuring device, the two partial beams of rays, split at measuring standard 13, act as a measuring beam and a reference beam. They are used for the interferential generation of position signals with regard to the object motion along second main axis of motion x. Strictly speaking, in contrast to the position-measuring device described with reference to FIGS. 2a to 2d, they are really two measuring beams, since both measuring beams impinge on moving object 1. On the other hand, in the position-measuring device described with reference to FIGS. 2a to 2d, the reference beam does not arrive at object 1. However, for reasons of uniform terminology, hereinafter a measuring beam and a reference beam are also denoted in the position-measuring device described with reference to FIGS. 2a to 2d, from whose superposition, the position signals of interest are generated.

Reflector 14.1, 14.2 includes two incident-light diffraction gratings, set apart in the direction of second main axis of motion x, which include periodically disposed graduation markings of different reflectivity. According to the view of the two incident-light diffraction gratings of reflector 14.1, 14.2 illustrated in FIG. 3c, the graduation markings extend at an angle relative to second main axis of motion x. Because of the formation of the incident-light diffraction gratings, i.e., of reflector 14.1, 14.2 selected in this manner, the two partial beams of rays are reflected back upon themselves in the direction of measuring standard 13 on object 1 (Littrow configuration).

Via measuring standard 13, the two partial beams of rays thereupon undergo a first reflection back in the direction of retroreflector system 12.6. There, in beam-splitter element 12.2, the two incident partial beams of rays are deflected at deflection surface 12.7 in the direction of retroreflector 12.3, and subsequently, a retroreflection and a reflection of the partial beams of rays take place once more at deflection surface 12.7 in the direction of measuring standard 13 on object 1. On measuring standard 13, the two partial beams of rays then arrive at a second impact location P2 which is set apart in the z-direction relative to first impact location P1 of the beam of rays. From measuring standard 13, a second reflection of the partial beams of rays ultimately results in the direction of reflector 14.1, 14.2. At reflector 14.1, 14.2, the two partial beams of rays then undergo a second reflection in the direction of measuring standard 13. On measuring standard 13, the partial beams of rays, or more precisely, the measuring beam and reference beam, are recombined and propagate as a superposed beam of rays in the direction of detector system 12.5, again indicated only schematically. In the event object 1, including measuring standard 13, moves along second main axis of motion x, a plurality of phase-shifted position signals are generated via detector system 12.5, which are usable for controlling the motion of object 1, for instance.

Because of the selected beam path with the twice-repeated impingement of measuring standard 13 and the traversal of retroreflector system 2.6 provided in between, it is possible to compensate for resulting breakdowns of the position signals due to tiltings of moving object 1. In the event of such tiltings, beam shears and moiré effects would result and lead to the mentioned losses in the intensity of the position signals.

Additional and/or alternative configurations to those described above are possible. For example, it may be provided to form reflector 14.1, 14.2 above object 1 using two plane mirrors, for example, each being positioned perpendicularly to the partial beam of rays falling on it. Moreover, it is possible to replace one-dimensional measuring standard 13, disposed on object 1 at angle α relative to third axis z, by a two-dimensional measuring standard disposed on the object so as to be parallel to third axis z. Besides the periodic graduation markings along second main axis of motion x, it would then also include graduation markings disposed periodically along third axis z.

Moreover, instead of the +$1^{st}$ and −$1^{st}$ orders of diffraction, it is also possible to use two other unequal orders of diffraction for the measuring beam path and reference beam path, and to bring them to interfering superposition.

Referring to FIGS. 4a to 4d, a system is described which is suitable for measuring the position of an object 1 in six degrees of freedom using a plurality of position-measuring devices. Object 1, e.g., again a table in a machine for manufacturing or inspecting semiconductor devices, is movable along a first and second main axis of motion y, x, as well as along a third axis z perpendicular thereto, as illustrated in FIG. 1. First main axis of motion y again represents the longer of the two traversing axes in the x direction and y direction. Object 1 is displaceable along this first main axis of motion y by an amount which is substantially longer than the extension of object 1 in this direction.

Figure 4A:
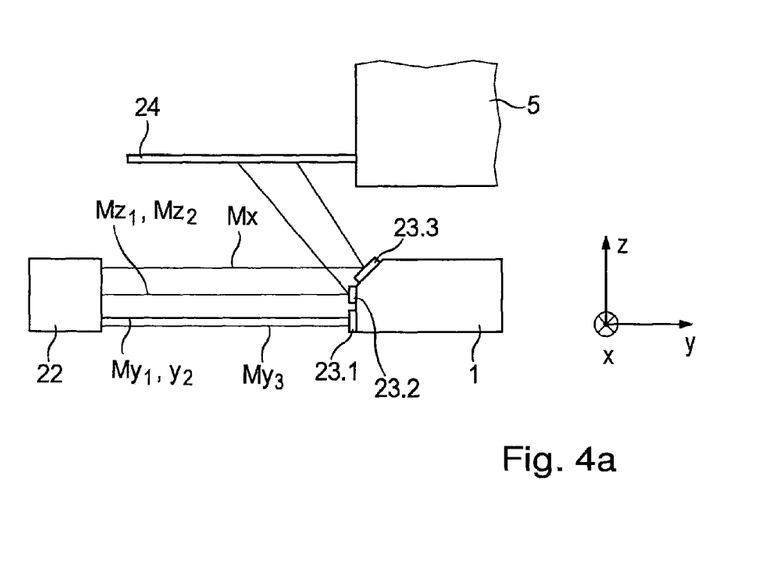
FIG. 4a is a schematic view of a system according to an example embodiment of the present invention in a first view, in the zy-plane.
Figure 4B:
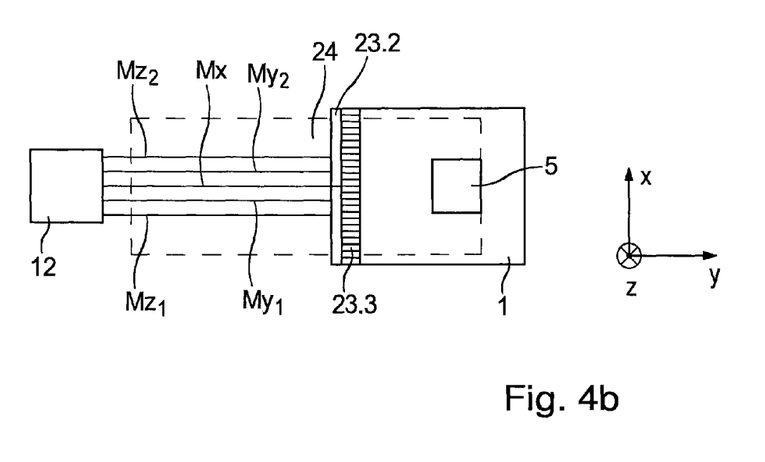
FIG. 4b is a schematic view of the system illustrated in FIG. 4a in a second view, in the xy-plane.

The most important measuring-beam paths which are used to measure or determine the position of object 1 in six degrees of freedom are indicated schematically in FIGS. 4a and 4b. A representation of the detailed beam paths of the individual position-measuring devices is omitted for reasons of clarity. In particular, it is not indicated, for example, that the different measuring beams propagate twice in the direction of object 1.

To determine the motion of object 1 along first main axis of motion y and to determine rotational motions Rx, Rz of object 1 about second main axis of motion x and third axis z, a, e.g., conventional, position-measuring device is provided, for example, a 3-axis interferometer as described in U.S. Pat. No. 6,542,247, which is expressly incorporated herein in its entirety by reference thereto.

Figure 4C:
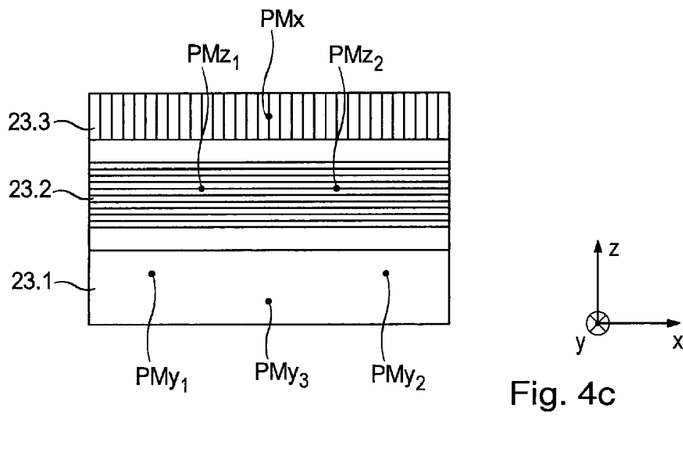
FIG. 4c is a top view of the measuring reflector and the measuring standards of the system illustrated in FIGS. 4a and 4b.

The 3-axis interferometer employed in the system uses three measuring beams $My_1$, $My_2$, $My_2$, which in each case probe object 1 from the direction of second main axis of motion x. To that end, disposed on object 1 is a measuring reflector 23.1, upon which, as illustrated in FIGS. 4a and 4b, the three measuring beams $My_1$, $My_2$, $My_2$ fall, and from there, are reflected back again in the direction of optical unit 12. Measuring reflector 23.1 is situated on object 1 on the side which is assigned to optical unit 12 in second main axis of motion x. In FIG. 4c, measuring reflector 23.1 is discernible from the probing direction, as well as impact points $PMy_1$, $PMy_2$, $PMy_3$ of the three measuring beams $My_1$, $My_2$, $My_3$ falling on it. The further optical components of the 3-axis interferometer, as well as of the further position-measuring devices of the system, are accommodated in optical unit 12. For instance, in the case of the 3-axis interferometer, they include, for example, a suitable light source, one or more beam-splitter elements, a reference reflector, and a detector system.

As illustrated in FIGS. 4a to 4c, first and second measuring beams $My_1$, $My_2$ of this position-measuring device, that is, of the 3-axis interferometer, travel at the same level in the z-direction and strike measuring reflector 23.1 at impact points $PMy_1$, $PMy_2$, set apart from each other in the x-direction. In the exemplary embodiment illustrated, third measuring beam $My_3$ of the 3-axis interferometer travels in the z-direction below both first and second measuring beams $My_1$, $My_2$, and strikes measuring reflector 23.1 at impact point $PMy_3$.

Thus, three degrees of freedom with respect to the object motion may be determined from the distance signals which are obtained via three such measuring beams $My_1$, $My_2$, $My_3$. In each case, the corresponding distance signals result from the interfering superposition of measuring beams $My_1$, $My_2$, $My_3$ with reference beams, and the detection of the corresponding signals by suitable detector systems. As mentioned above, they are the motion of object 1 along first main axis of motion y and rotational motions Rx, Rz of object 1 about second main axis of motion x and third axis z.

In order to determine the motion of object 1 in two further degrees of freedom, e.g., the motion of object 1 along third axis z and rotational motion Ry of object 1 about first main axis of motion y, two further position-measuring devices are used, each having a design and beam path, respectively, like the first position-measuring device described in detail above. The two utilized measuring beams of these position-measuring devices are denoted in FIGS. 4a and 4b by reference symbols $Mz_1$, $Mz_2$ and travel at the same level in the z-direction and set apart from each other in the x-direction. As described above, at object 1, the two measuring beams $Mz_1$, $Mz_2$ of this position-measuring device strike the two impact points $PMz_1$, $PMz_2$ on measuring standard 23.2, via which they are deflected to reflector 24. From reflector 24, corresponding measuring beams $Mz_1$, $Mz_2$ of these two position-measuring devices are reflected back again via measuring standard 23.2 in the direction of optical unit 12, where the various other necessary optical components of these two position-measuring devices are also located.

Like measuring reflector 23.1 of the 3-axis interferometer, measuring standard 23.2 required for these two position-measuring devices is situated on object 1 on the side which is assigned to optical unit 12 in second main axis of motion x. FIG. 4c is a top view of this side from the probing direction.

In order to determine the sixth degree of freedom of movable object 1, namely, the motion of object 1 along second main axis of motion x, a position-measuring device is provided in the system which corresponds to the second position-measuring device described above. The associated measuring beam is denoted by Mx in FIGS. 4a and 4b and strikes at impact point PMx on measuring standard 23.3 situated on object 1. Like the other measuring standard 23.2 and measuring reflector 23.1 of the 3-axis interferometer, this measuring standard 23.3 is also disposed on object 1 on the side which is assigned to optical unit 12 in second main axis of motion x. From measuring standard 23.3, the splitting and deflection of measuring beam Mx, i.e., of the corresponding partial beams of rays, take place in the direction of reflector 24. The subsequent beam path corresponds to that which is described above in connection with the position-measuring device illustrated in FIGS. 3a to 3d. The further optical components of this position-measuring device are disposed in optical unit 12, as well.

Figure 4D:
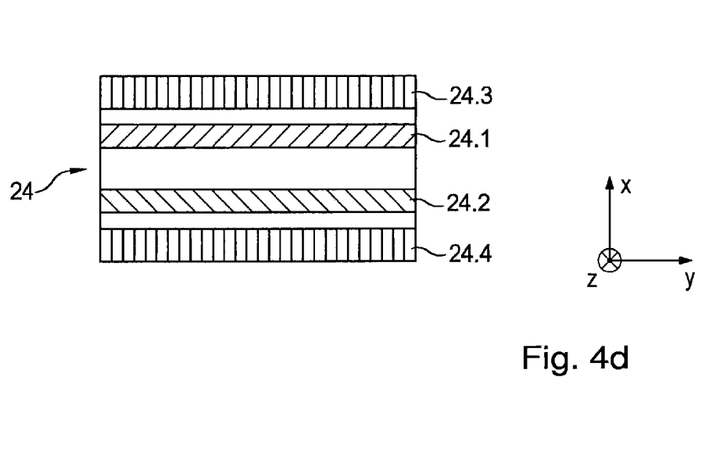
FIG. 4d is a top view of the reflector of the system illustrated in FIGS. 4a to 4c.

FIG. 4d shows the side of reflector 24 which measuring beams $Mz_1$, $Mz_2$ and Mx, diffracted by measuring standards 23.2, 23.3, strike and are reflected back again in a Littrow configuration. Besides the two, centrally disposed reflectors 24.1, 24.2 for measuring beam Mx, the two outwardly disposed reflectors 24.3, 24.4 for measuring beams $Mz_1$, $Mz_2$ are illustrated. As explained above, the various reflectors are each in the form of an incident-light diffraction grating.

The position of movable object 1 may now be determined in all six degrees of freedom by this system. It is important in the system that the optical scanning or probing of all position-measuring devices used are carried out from a single probing direction. In the exemplary embodiment illustrated, this is first main direction of motion y, along which a markedly longer travel path is possible for object 1 compared to second main direction of motion x. All measuring beams $My_1$, $My_2$, $My_3$, $Mz_1$, $Mz_2$ and Mx of the various position-measuring devices employed travel along this direction.

Besides the exemplary embodiments of the position-measuring devices and the system described herein, other arrangements are possible without departing from the spirit and scope hereof. For example, alternative beam paths in the respective position-measuring devices, other variants for realizing reference beam paths, or alternative variants for the requisite retroreflection, etc., may be provided.

What is claimed is:

1. A position-measuring device for determining a position of an object along a third axis oriented perpendicularly to two orthogonal, first and second main axes of motion of the object, comprising:
   a light source adapted to emit a beam of rays along the first main axis of motion in a direction of the object;
   a measuring standard arranged on the object and including graduation markings disposed periodically along the third axis;
   at least one reflector arranged along the third axis and set apart from the object;
   a retroreflector system; and
   a detector system;
   wherein position signals with respect to motion of the object along the third axis are generatable from superposition of a measuring beam and a reference beam produced from the beam of rays.

2. The position-measuring device according to claim 1, wherein the retroreflector system includes a beam-splitter element, a reference reflector, and a retroreflector.

3. The position-measuring device according to claim 1, wherein the reflector: (a) includes an incident-light diffraction grating having graduation markings disposed periodically along the first main axis of motion; or (b) includes a plane mirror disposed perpendicularly to the measuring beam that falls on the plane mirror.

4. The position-measuring device according to claim 1, wherein the measuring standard includes an incident-light diffraction grating adapted to diffract beams of rays only in a +/−1$^{st}$ order and to reflect diffracted partial beams of rays of the +/−1$^{st}$ order in a direction of the reflector.

5. The position-measuring device according to claim 1, wherein the retroreflector system is adapted to split the beam of rays emitted by the light source into:
(a) a measuring beam that:
  (i) propagates in a direction of the measuring standard, and by the measuring standard, undergoes a first reflection and diffraction in a direction of the reflector;
  (ii) undergoes a first reflection by the reflector back in the direction of the measuring standard;
  (iii) undergoes a first reflection by the measuring standard back in a direction of the retroreflector system, where the measuring beam undergoes a retroreflection and reflection back in the direction of the measuring standard;
  (iv) undergoes, at the measuring standard, a second reflection and diffraction in the direction of the reflector;
  (v) undergoes, at the reflector, a second reflection back in the direction of the measuring standard; and
  (vi) undergoes, at the measuring standard, a second reflection back in the direction of the retroreflector system; and
(b) a reference beam that:
  (i) traverses the retroreflector system;
  (ii) is then superposed with the measuring beam arriving after the second reflection back at the measuring standard; and
  (iii) propagates, with the superposed measuring beam, in the direction of the detector system.

6. The position-measuring device according to claim 1, wherein the measuring standard includes a reflective diffraction grating.

7. A position-measuring device for determining a position of an object along a second main axis of motion, the object movable along a first main axis of motion and movable along the second main axis of motion, the first and second main axes of motion being orthogonal, comprising:
a light source adapted to emit a beam of rays along the first main axis of motion in a direction of the object;
a measuring standard arranged on the object and including graduation markings disposed periodically along the second main axis of motion;
at least one reflector arranged in a direction of a third axis, set apart from the object, the third axis arranged perpendicularly to the two first and second main axes of motion;
a retroreflector system; and
a detector system;
wherein position signals with respect to motion of the object along the second main axis of motion are generatable from superposition of a measuring beam and a reference beam produced from the beam of rays.

8. The position-measuring device according to claim 7, wherein the reflector includes (a) two incident-light diffraction gratings are set apart in a direction of the second main axis of motion and have periodically disposed graduation markings or (b) includes two plane mirrors set apart in the direction of the second main axis of motion, each plane mirror arranged perpendicularly to the measuring beam that falls on the plane mirror.

9. The position-measuring device according to claim 7, wherein the measuring standard includes an incident-light diffraction grating adapted to diffract a beam of rays only in a +/−1$^{st}$ order, and to reflect diffracted partial beams of rays of the +/−1$^{st}$ as the measuring team and the reference beam in a direction of the reflector.

10. The position-measuring device according to claim 7, wherein the measuring standard: (a) is arranged as a one-dimensional measuring standard disposed on the object at an angle unequal to 0° relative to the third axis; or (b) is arranged as a two-dimensional measuring standard disposed on the object parallel to the third axis and includes graduation markings disposed periodically along the third axis.

11. The position-measuring device according to claim 7, wherein the light source is adapted to emit the beam of rays to propagate in a direction of the measuring standard, and the measuring standard is adapted to split the beam of rays into two partial beams of rays, as the measuring beam and the reference beam for interferential generation of position signals, that:
(a) propagate, after being reflected at the measuring standard, in different directions to the reflector;
(b) undergo, at the reflector, a first reflection back in the direction of the measuring standard;
(c) undergo, at the measuring standard, a first reflection back in a direction of the retroreflector system, where the two partial beams of rays undergo a retroreflection and reflection back in the direction of the measuring standard;
(d) undergo, at the measuring standard, a second reflection and diffraction in a direction of the reflector;
(e) undergo, at the reflector, a second reflection back in the direction of the measuring standard; and
(f) are recombined at the measuring standard and propagate as a superposed beam of rays from the measuring standard in a direction of the detector system.

12. A system, comprising:
an object movable along two orthogonal, first and second main axes of motion and along a third axis perpendicular to the first and second main axes of motion; and
a plurality of position-measuring devices adapted to determine a position of the object in several spatial degrees of freedom;
wherein the plurality of optical position-measuring devices are adapted to scan the object from a single probing direction that coincide with one of the main axes of motion; and
wherein to determine motion of the object along the third axis and to determine rotational motion of the object about the first main axis of motion, the plurality of position-measuring devices include two position-measuring devices according to claim 6 having two measuring beams arranged to impinge on a measuring standard on the object, the two measuring beams traveling at the same level along the third axis and set apart in the second main axis of motion.

13. A system, comprising:
an object movable along two orthogonal, first and second main axes of motion and along a third axis perpendicular to the first and second main axes of motion; and
a plurality of position-measuring devices adapted to determine a position of the object in six spatial degrees of freedom, wherein the six degrees of freedom are object movements along each of the three axes of motion and object rotations about each of the three axes of motion;

wherein the plurality of optical position-measuring devices are adapted to scan or probe the object from a single probing direction that coincides with one of the main axes of motion.

14. The system according to claim 13, wherein all measuring standards and/or measuring reflectors of the position-measuring devices provided on the object are located on one common side of the object.

15. The system according to claim 14, wherein the measuring standard includes a reflective diffraction grating.

16. The system according to claim 13, wherein a position-measuring device adapted to determine motion of the object along the first main axis of motion and to determine rotational motions of the object about the second main axis of motion and about the third axis is arranged as a 3-axis interferometer having three measuring beams configured to impinge on a measuring reflector on the object, in which a first measuring beam and a second measuring beam travel at the same level in the third axis and set apart in the second main axis of motion and a third measuring beam travels in a direction of the third axis below the first measuring beam and the second measuring beam.

* * * * *